July 22, 1952 W. D. TEAGUE ET AL 2,604,222
NURSING UNIT
Filed July 30, 1948 3 Sheets-Sheet 1
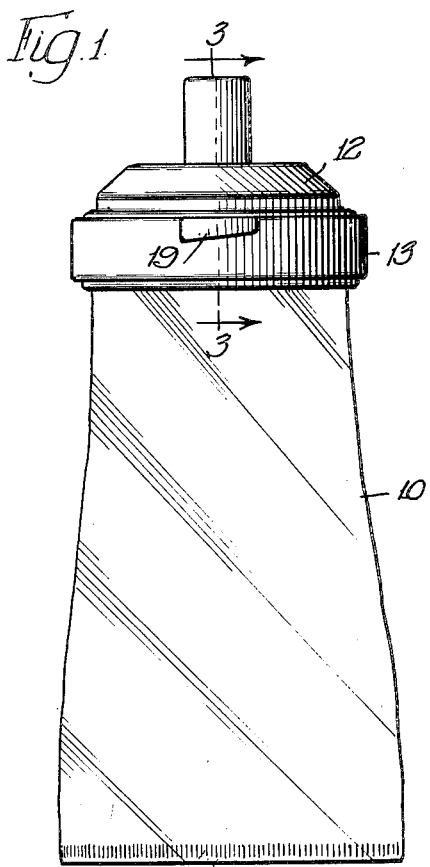
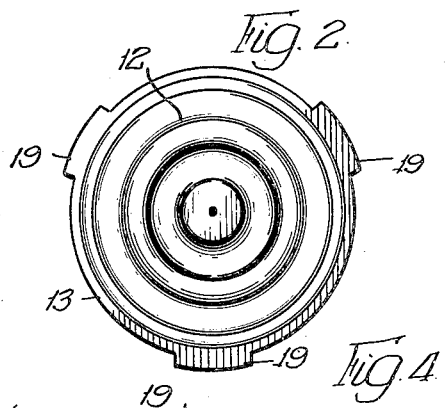
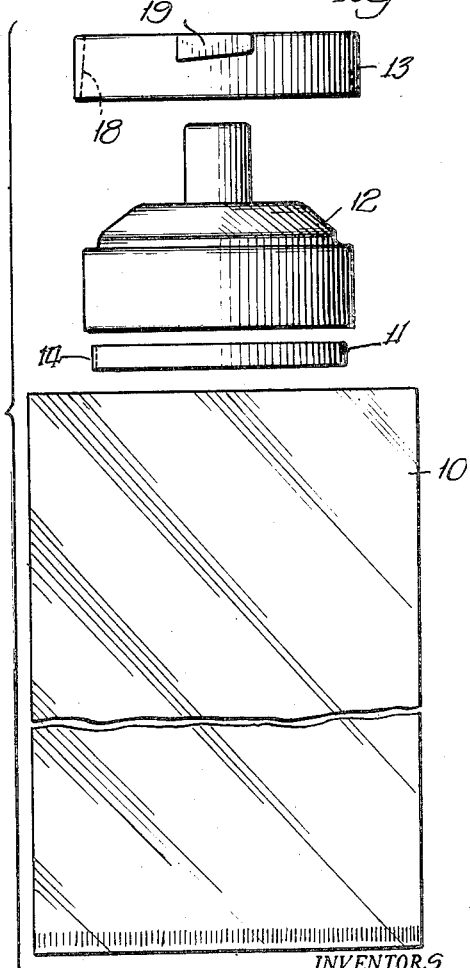
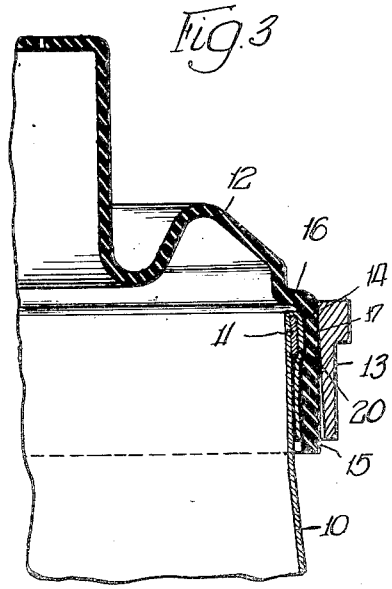
INVENTORS
Walter Dorwin Teague,
BY Gordon M. Peltz,
Milton Immermann,
Cromwell, Greist & Warden
ATTYS July 22, 1952  W. D. TEAGUE ET AL  2,604,222
NURSING UNIT
Filed July 30, 1948  3 Sheets-Sheet 2
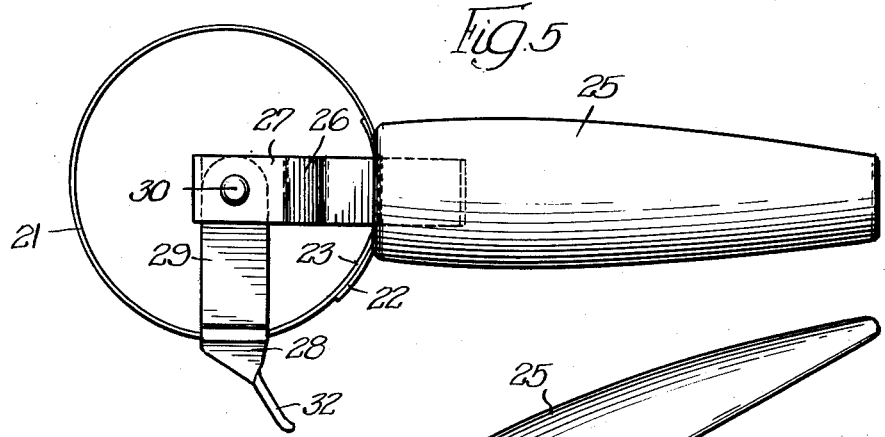
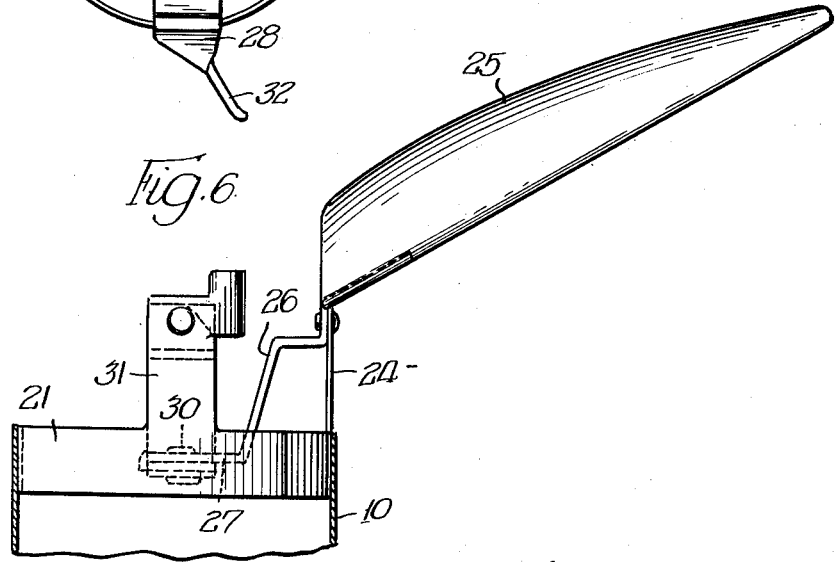
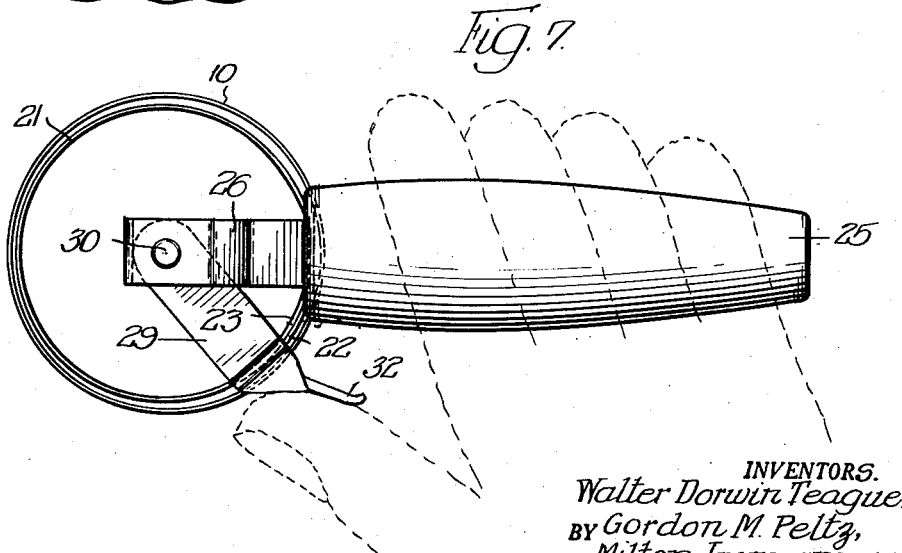
INVENTORS.
Walter Dorwin Teague,
BY Gordon M. Peltz,
Milton Immermann,
Cromwell, Greist & Warden
ATTYS.

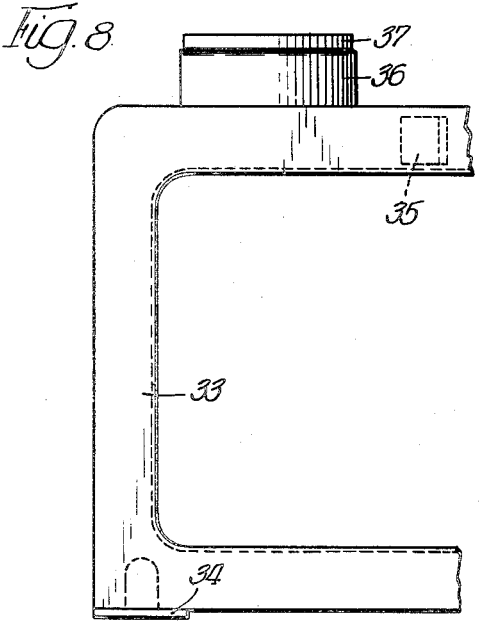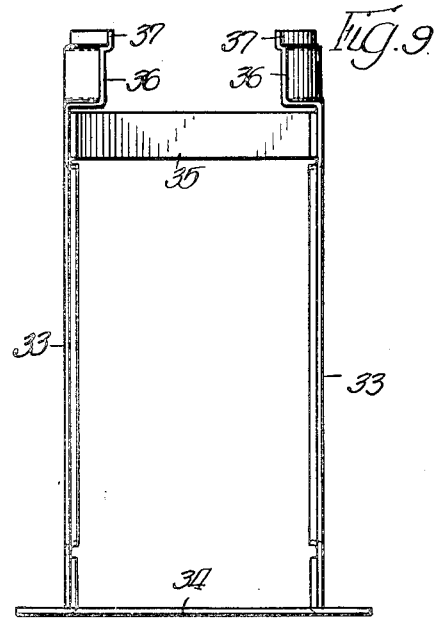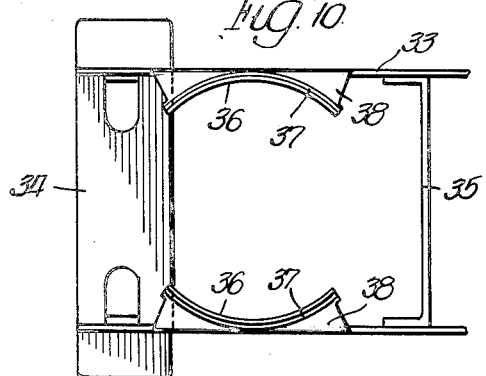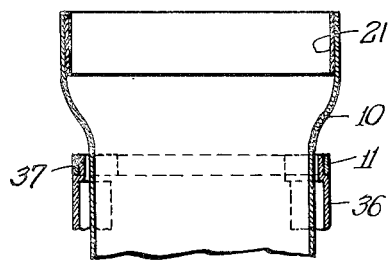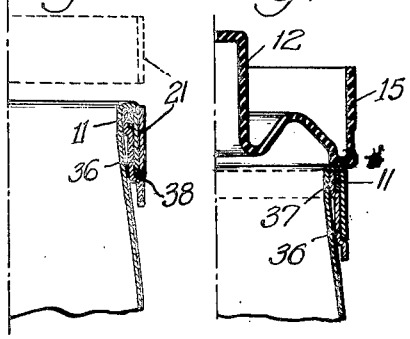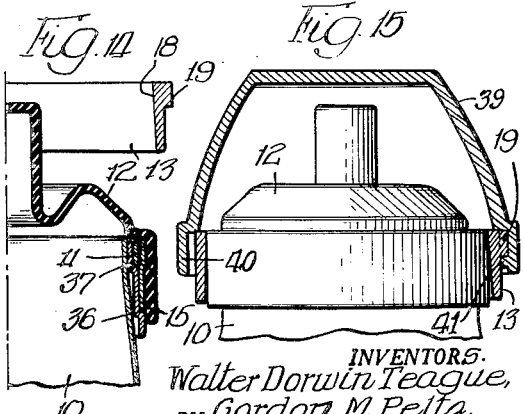

Patented July 22, 1952

2,604,222

UNITED STATES PATENT OFFICE 2,604,222

NURSING UNIT

Walter Dorwin Teague, Annandale, N. J., and Gordon M. Peltz, Kew Gardens, and Milton Immermann, Piermont, N. Y., assignors to Shellmar Products Corporation, Chicago, Ill., a corporation of Delaware Application July 30, 1948, Serial No. 41,554

4 Claims. (Cl. 215—11)

This invention relates to improvements in a nursing unit of the type which comprises a flanged nipple and a disposable container member and method and apparatus for securing the nipple and the container member in communicating relation.

It is an object of the invention to provide a nursing unit which is characterized by a nursing nipple, a flexible disposable container member and means for detachably securing the container member in communicating relation with the nipple.

It is a further object of the invention to provide a nursing unit comprising a disposable bag or bottle member which is formed of flexible material, a nipple formed of resilient material and having a depending flange portion and an attaching ring for securing the top of the bottle member in fluid tight relationship with the flange portion on the nipple.

Another object of the invention is to provide a nursing unit comprising a nursing nipple, a flexible disposable container and a ring member for attaching the mouth of the container to the nipple in such a manner that the fluid in the nursing unit comes in contact only with the interior surface of the container and the nursing nipple, the ring member being positioned exteriorly of the disposable container.

A further object of the invention is to provide a nursing unit comprising a disposable, flexible receptacle in combination with a flanged resilient nipple and a relatively small attaching ring adapted to fit within the flanged portion of the nipple and to retain in clamped relation therein a reversely bent portion of the mouth of the receptacle.

Another object of the invention is to provide a nursing unit comprising a flanged nipple, a flexible disposable container, an inner attaching ring of relatively small cross section which is adapted to have the marginal portions of the flexible container folded outwardly over the same and held in position thereon by the flange on the nipple and an outer clamping ring adapted to be positioned in clamping relation over the flange on the nipple.

Another object of the invention is to provide a method of assembling a flexible disposable container member in communicating relation with a nursing nipple by expanding the mouth of the container, folding the marginal portions thereof about a relatively small attaching ring, placing a nipple having a reversible skirt thereon in contact with the folded portions of the container and inverting the skirt on the nipple to position the same in encompassing relation about the attaching ring whereby the folded marginal portions of the container are clamped between the ring and the skirt on the nipple.

Another object of the invention is to provide a method and apparatus for assembling a flexible disposable nursing bottle in communicating relationship with a nursing nipple having a depending skirt thereon which comprises providing a stand having an upwardly extending shouldered flange thereon for supporting a relatively narrow attaching ring and a bottle top expanding and holding device adapted to be inserted in contracted condition into the mouth of the disposable bottle and thereafter to be expanded into gripping relation with the internal marginal portions of the bottle whereby the bottle may be manipulated by the expanding and holding device to insert the body of the bottle within the securing ring and to fold the top marginal portions of the bottle around the attaching ring, thereby permitting the nursing nipple to be secured over the bottle top by moving the depending skirt into position around the folded portion of the bottle to clamp the same in fluid tight relationship on the attaching ring.

It is still another object of the invention to provide a bag top expanding and holding device or tool comprising a split ring and pivotally related members for contracting the ring whereby it may be inserted within the top of a container and upon release will expand to grip the container adjacent the inner marginal portions thereof.

A further object of the invention is to provide a stand for use in assembling and supporting nursing units of the character described which comprises a generally rectangular open frame having a flange member projecting upwardly from the top thereof and provided with a peripheral recess in the outer edge in which the attaching ring is adapted to be seated while the marginal portions of the flexible container top are folded thereover and the nursing nipple is secured thereto by the depending skirt provided on the nursing nipple.

These and other objects of the invention will be apparent from a consideration of the nursing unit and the apparatus for and method of assembling the same which are shown by way of illustration in the accompanying drawings, wherein Fig. 1 is an elevation of a nursing unit in assembled condition which embodies the principles of the invention;

Fig. 2 is a top plan view of the nursing unit;

Fig. 3 is a partial vertical section to an enlarged scale taken on the lines 3—3 of Fig. 1;

Fig. 4 is an exploded elevation of the separate parts which constitute the nursing unit;

Fig. 5 is a plan view of an expanding and gripping tool for use in assembling the disposable container with the nursing nipple;

Fig. 6 is a side elevation of the tool shown in Fig. 5;

Fig. 7 is a plan view illustrating the manner of inserting the tool in the mouth of the container;

Fig. 8 is a partial side elevation of a rack for use in assembling and thereafter supporting the nursing units.

Fig. 9 is an end elevation of the supporting rack;

Fig. 10 is a plan view of the supporting rack;

Fig. 11 is a fragmentary section illustrating the manner of inserting the flexible container within the ring supporting portion of the rack;

Fig. 12 is a view similar to Fig. 11 showing the top of the container in folded position over the attaching ring and indicating in dotted lines the expanding tool removed from the container top;

Fig. 13 is a view similar to Fig. 12 showing the nursing nipple in position for securing same on the top of the container by reversing the flange of the nipple;

Fig. 14 is a view similar to Fig. 13 with the nursing nipple and the container in assembled relation and an outside retainer ring in position to be applied to the same; and Fig. 15 is a view partly in section showing the container top clamped between the inner ring and the flange of the nipple by the outer ring and also showing a cap member detachably secured to the outer ring.

Referring to Figs. 1 to 4 of the drawings, there is illustrated a nursing unit which incorporates therein the principles of the invention. The unit, as illustrated, comprises a flexible disposable container or bottle member 10, an attaching or connecting ring 11, a nursing nipple 12 and a clamping ring 13.

The container or bottle member 10 consists of a length of tubular material which is flexible and which may be formed of any suitable sheet-like material but which is preferably formed of polyethylene, "Pliofilm" or similar transparent sheet forming material. The container 10 is closed by a transverse seal at the one end and open at the other end. It is formed with a diameter which will permit the top or mouth portions to be folded outwardly over and down around the outside periphery of the rigid attaching ring 11. The containers 10 are adapted to be furnished to the user preferably in rolls which comprise a predetermined length of flattened, sterilized tube transversely sealed at spaced intervals to provide a plurality of containers or bags which may be cut one at a time from the end of the roll.

The attaching ring 11 is preferably formed of metal or other rigid material of relatively small rectangular cross section providing an outer peripheral face 14 which constitutes one of the clamping surfaces for securing the container top to the nipple 12.

The nursing nipple 12, which is formed of rubber-like material, is preferably of the wide base type and is provided with an integral flange or skirt portion 15 which is reversible about a hinge line 16 where it connects with the base of the nipple. The skirt portion 15 is provided with a groove 17 adjacent the upper extremity and on the internal surface when the skirt is in depending position. The groove 17 is of a width or depth which corresponds approximately to the depth of the attaching ring 11 and is relatively shallow. The groove 17 is adapted to accommodate portions of the folded container top and resist separation of the container from engagement with the skirt.

An outer clamping ring or band 13 may be provided for further securing the attaching ring 11 and the container top in clamping relation with the skirt portion 15 of the nipple 12. The ring 13 comprises a relatively rigid band of metal, plastic or similar rigid material having a depth approximating that of the skirt 15. It is provided internally with a surface 18 which is tapered slightly downwardly and outwardly to permit a wedging action between such surface and the exterior surface of the skirt 15. The band 13 is provided with projections 19 on its external surface for a purpose which will be described.

When in assembled relation the marginal portions 20 (Fig. 3) at the mouth of the container 10 are folded outwardly and downwardly of the small inner attaching ring 11. The marginal portions 20 are clamped against the outer surface 14 of the ring 11 by the reversible skirt 15 of the nipple 12 which has been positioned in downwardly depending relation to the main portion of the nipple. Outer portions of the folded margin 20 of the container are accommodated in the groove 17 of the skirt 15 and the resiliency of the material holds the members in clamped relation. The outer clamping ring 13 may be placed over the skirt 15 to further clamp the members, if desired.

Referring to Figs. 5 to 7 of the drawings, there is illustrated an expanding and holding device or tool which is adapted for use in manipulating the flexible disposable container member 10. While it is not necessary to use the tool in assembling the unit the tool is particularly designed to facilitate certain operations involved in associating the container ring 10 with the attaching ring 11.

The tool comprises a relatively thin band or ring-like member 21 of resilient metal or similar material. The band 21 is of substantial width or depth and is provided with overlapping free ends 22 and 23 which are movable relative to each other to vary the diameter of the band member. A plate 24, which may be formed integrally with the band member 21, extends upwardly adjacent one of its free ends 22 and is attached to the inner end of inclined handle grip member 25. Also attached to the inner end of member 25 is an angularly bent plate or bracket member 26 which is arranged with an inner end or lower portion 27 extending radially of the ring 21 within the plane of the top and bottom edges thereof. An angularly bent plate or bracket 28 is also provided having a portion 29 which extends radially of the ring member and which is pivotally connected at 30 with the bracket portion 27, the pivotal connection 30 being approximately in the center of the band member 21. At its outer end the bracket 28 is secured to an upstanding plate 31 which may be formed integrally with the band member 21 adjacent the end 23 of the same. The bracket member 28 is provided with an outwardly projecting portion 32 which serves as a thumb or finger piece for engagement by the user.

As illustrated in Fig. 7 the handle member 25 and the finger piece 32 are gripped by the hand and thumb of the user and moved toward each other to contract the band 21 for insertion in the top of the container 10. The band 21 is moved into the mouth of the container and then allowed to spring outwardly into clamping engagement with the inner surfaces of the marginal portions of the container thereby expanding the mouth of the container to its maximum diameter. The container may then be manipulated to associate the same with the attaching ring 11 in a manner which will be explained.

Referring to Figs. 8 to 10, there is illustrated a supporting rack or stand which is adapted for use in assembling and filling the nursing unit and also for supporting one or more of the filled units in a refrigerator or other storage compartment.

The supporting rack comprises a pair of laterally spaced generally rectangular upright open frame members 33 which are connected at the base by cross pieces 34 and at the top by cross pieces 35. One end only of the rack is illustrated, it being understood that the length of the same will depend upon the number of units it is desired to assemble and/or support.

The rack is provided on the top with upstanding flanges 36 which may be formed integral with the top frame members. The flanges 36 project inwardly and are curved to form a tube-like supporting section. The flanges 36 are provided at the top edge thereof with a shoulder forming recess 37 which is of a size to receive the small attaching ring member 11 of the nursing unit. The flanges 36 may be formed to provide a complete tube section or their ends may be spaced, as illustrated, to provide open sides. The flanges 36 will be arranged in spaced relation lengthwise of the rack when it is desired to provide for a plurality of the units on a single rack.

While the nursing unit may be assembled by hand without the use of the expanding tool or the supporting rack both these devices are particularly designed to facilitate the assembling and filling operations.

In assembling the nursing unit the inner ring 11 is positioned in the recess 37 provided on the top edges of the flanges 36 of the rack and the marginal portions of the container top are associated with the ring.

The container 10 is opened at the mouth and the band 21 of the expanding tool is inserted, the handle 25 and the thumb plate 32 being gripped as indicated in Fig. 7 to contract the band 21 to a sufficiently small diameter to permit entry into the mouth of the container. The band 21 is allowed to expand by releasing thumb plate 32 until it grips the internal surfaces of the container adjacent the marginal portions thereof. With the container thus held on the tool the body of the container is passed through the ring 11 (Fig. 11) and moved to a position where the lower edge of the band 21 is approximately at the top edge of the ring 11. The container 10 is then grasped and held in substantially that position while the band 21 is moved downwardly outside of the ring 11 to position the marginal portions of the container in folded relation outside of the ring 11 and the tube section formed by flanges 36. The marginal portions 20 of the container and the band member 21 move relative to each other to position the band 21 outside of the container top as shown in Fig. 12. The horizontal portions 38 (Fig. 12) at the base of the flanges 36 act as a limit stop for the movement of the band 21. The container is then released from the tool by expanding the band 21 sufficiently to permit removal of the tool. At this point the milk or other fluid is placed in the container, after which the nipple 12 with the skirt 15 in the upwardly extending position is placed over the mouth of the container as indicated in Fig. 13 and the skirt is reversed or snapped downwardly over the folded marginal portions 20 of the container to clamp the container to the ring 11 as shown in Fig. 14, and the unit is ready for use.

As indicated in Figs. 14 and 15 the outer clamping ring or band 13 may be applied over the skirt 15 of the nipple 12 to further clamp the skirt 15 against the marginal portions 20 of the container and insure a leak-proof connection between the members.

In Fig. 15 a protecting cap or cover member 39 is shown which is adapted to be placed over the nipple 12 to protect it from contamination while being stored or handled. The cap 39 is provided with a depending flange 40 having internally projecting peripherally spaced lugs or thread forming members 41 which cooperate with the externally projecting lugs 19 on the outer clamping ring 13 to frictionally connect the members 13 and 19.

We claim:

1. A nursing unit comprising a flexible disposable receptacle, a ring-like connecting member of rectangular cross section, said connecting member being relatively thin and having a smooth peripheral surface of substantial depth, said connecting member being adapted to be positioned exteriorly of the receptacle with marginal portions of the receptacle folded outwardly and downwardly over said peripheral surface thereof, a nipple having an integral reversible skirt thereon adapted to be positioned with the skirt turned down over the folded marginal portions of the receptacle for clamping the receptacle between the same and the peripheral surface of said connecting member to place the receptacle and the nipple in communicating relation and a relatively rigid outer clamping band adapted to be positioned in snug fitting relation over the skirt on said nipple to retain said skirt in clamping relation on said connecting member whereby the connection between the receptacle and the nipple is sealed against leakage of nursing fluid.

2. A nursing unit as claimed in claim 1 and said outer clamping band being relatively wide and having a tapered inner surface.

3. A nursing unit comprising a flexible disposable receptacle, a ring-like connecting member of rectangular cross section, said connecting member being relatively thin and having a straight exterior peripheral surface portion of substantial depth, said connecting member being adapted to be positioned exteriorly of the receptacle with the marginal portions of the receptacle folded outwardly and downwardly over said exterior surface portion thereof and a nipple having an outwardly extending base portion terminating in a thickened portion forming an integral reversible vertically positioned skirt, said skirt being of substantially greater depth than said exterior surface portion of said connecting member, and said skirt being adapted to be positioned initially in upturned relation and finally in downwardly extending relation over the folded marginal portions of the receptacle for clamping the receptacle in relatively flat folded relation between the inner surface of the skirt and the exterior surface portion of said connecting member throughout the depth of said surface portion to place the receptacle and the nipple in communicating relation with the connection between the same sealed against leakage of the nursing fluid.

4. A nursing unit as recited in claim 3 and said skirt on said nipple having a relatively shallow groove on its inner surface when turned down over the marginal portions of the receptacle, which groove is approximately the same depth as the exterior surface portion of the connecting member, for cooperation with said connecting member to resist relative axial movement of said skirt and said connecting member.

WALTER DORWIN TEAGUE.
GORDON M. PELTZ.
MILTON IMMERMANN.

REFERENCES CITED

The following references are of record in the file of this patent:

UNITED STATES PATENTS

| Number | Name | Date |
|---|---|---|
| 1,776,394 | Powell | Sept. 23, 1930 |
| 1,965,736 | Dillman | July 10, 1934 |
| 2,110,928 | De Buys | Mar. 15, 1938 |
| 2,210,277 | Bullock | Aug. 6, 1940 |
| 2,359,249 | Scheer | Sept. 26, 1944 |
| 2,408,693 | Sidebotham | Oct. 1, 1946 |
| 2,446,451 | Allen | Aug. 3, 1948 |
| 2,448,569 | Allen | Sept. 7, 1948 |